T. THOMPSON.
HAY LOADER.
APPLICATION FILED DEC. 4, 1917.

1,277,666.

Patented Sept. 3, 1918.
5 SHEETS—SHEET 1.

Fig. 1.

Witnesses

T. Thompson, Inventor by C.A. Snow & Co.,
Attorneys

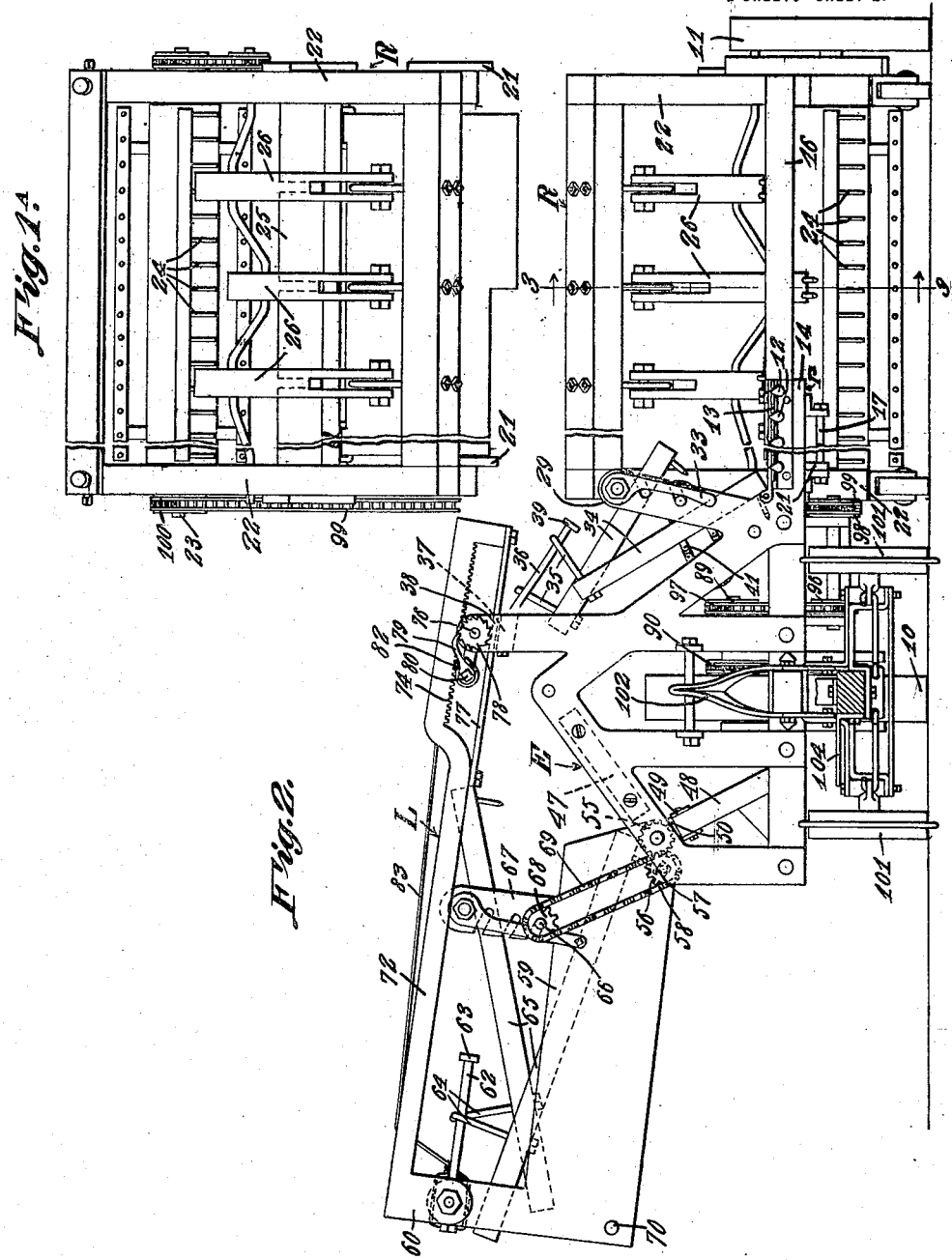

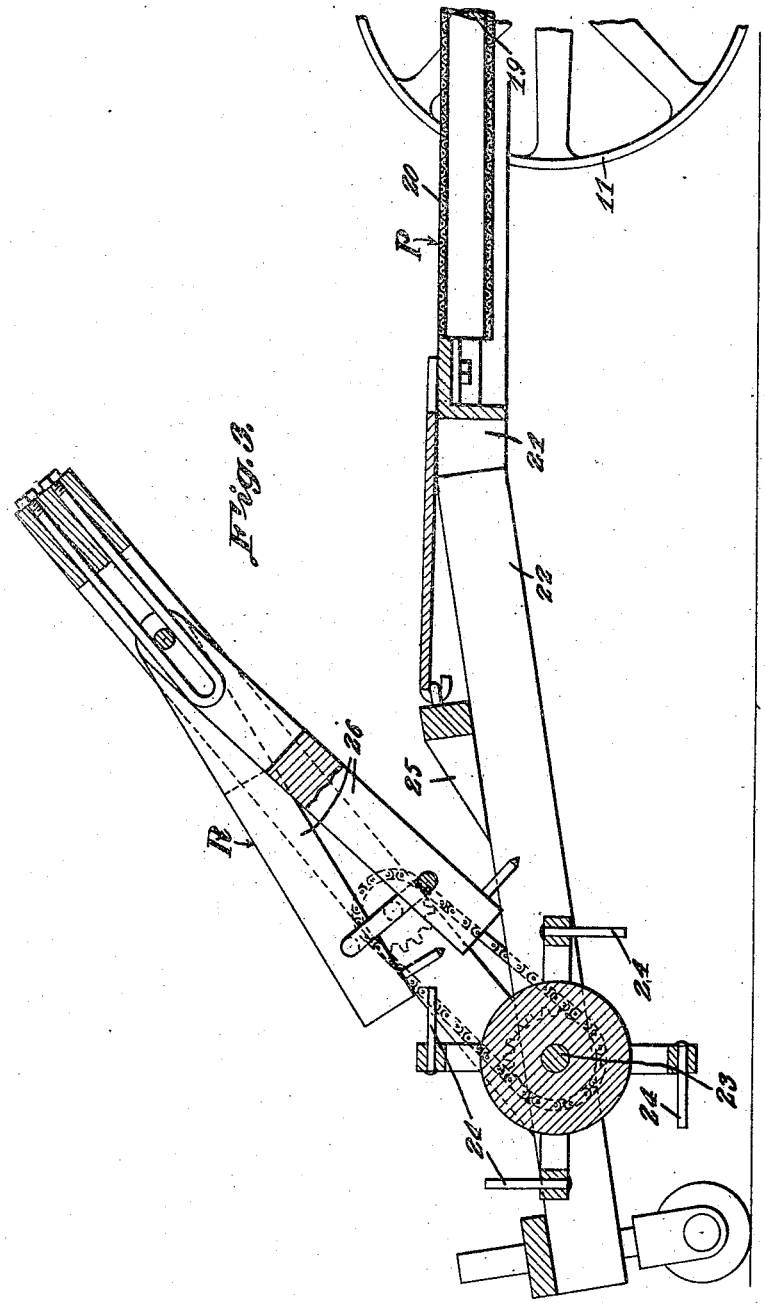

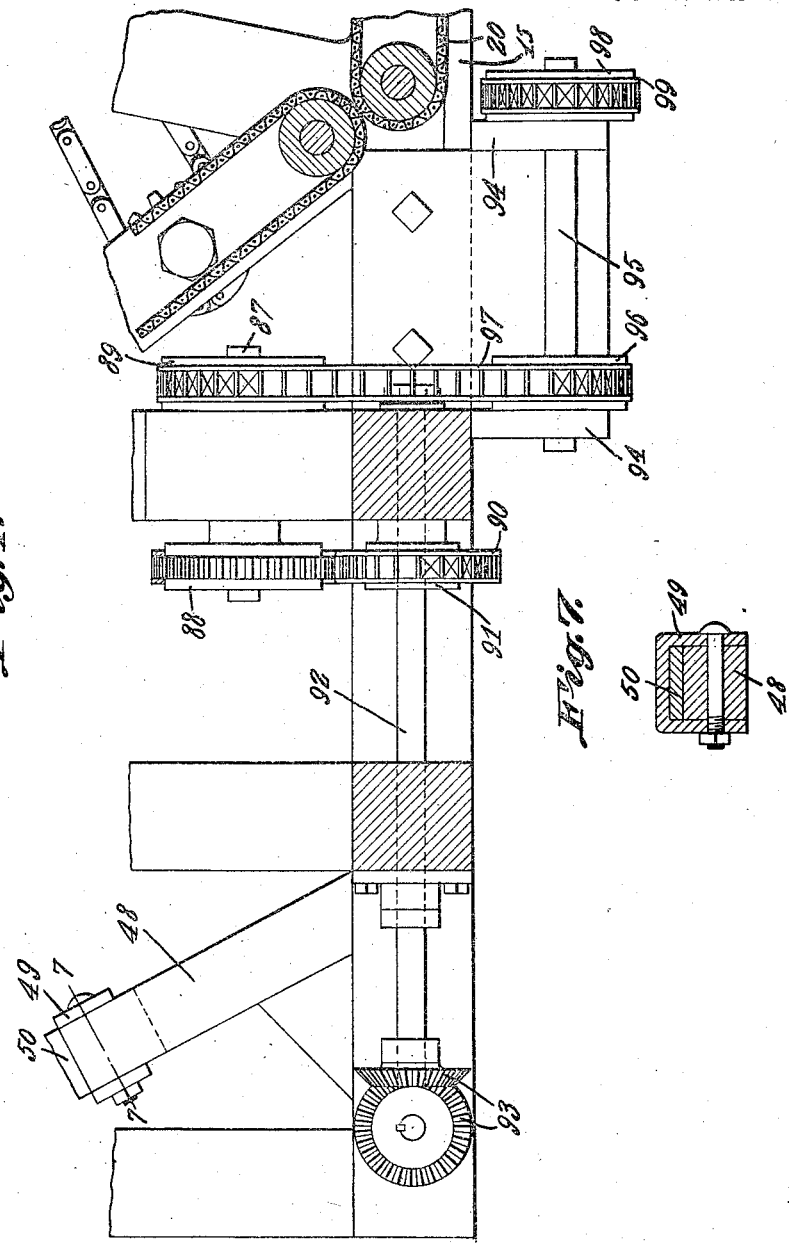

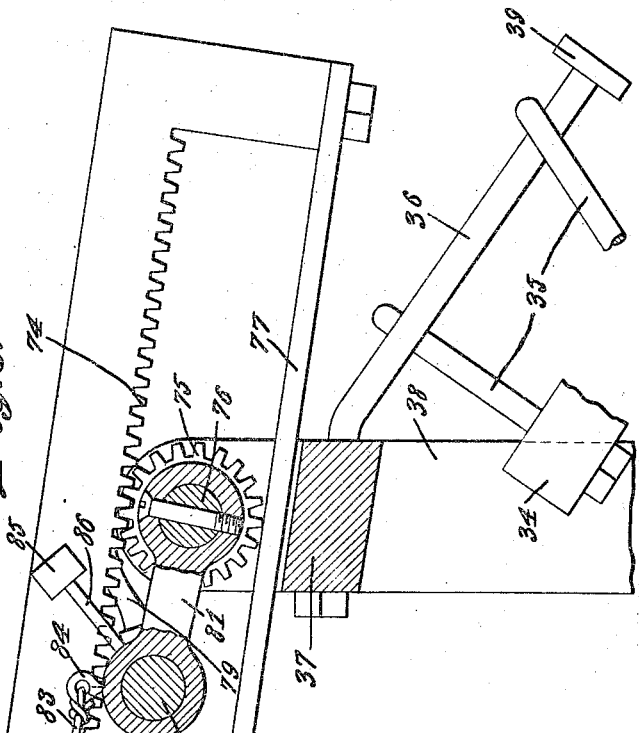
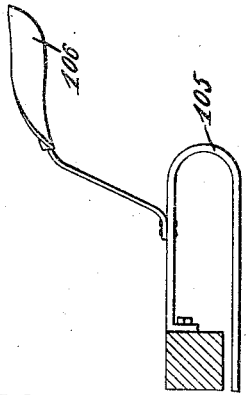

UNITED STATES PATENT OFFICE.

THOMAS THOMPSON, OF PAULLINA, IOWA.

HAY-LOADER.

1,277,666. Specification of Letters Patent. Patented Sept. 3, 1918.

Application filed December 4, 1917. Serial No. 205,372.

*To all whom it may concern:*

Be it known that I, THOMAS THOMPSON, a citizen of the United States, residing at Paullina, in the county of O'Brien and State of Iowa, have invented a new and useful Hay-Loader, of which the following is a specification.

The subject of this invention is a hay loader wherein a rake for collecting the hay is coöperatively associated with elevating mechanism, and the objects of the invention are, first, to provide attachments for the usual binder harvester which will convert the same into a hay collector and loader, second, to provide means for collecting the hay and delivering it to the platform canvas or conveyer, third, to provide means for elevating the hay from the platform to the loader, fourth, to provide loading mechanism for delivering the hay to the hay rack, fifth, to provide means for adjusting the loading mechanism, sixth, to provide an adjustable platform for receiving the hay, seventh, to provide a simple, durable, and efficient hay loader.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

A practical embodiment of the invention is shown in the accompanying drawings, wherein:—

Figure 1 is a plan view of a loader constructed in accordance with the present invention, the rake being detached;

Fig. 1ᴬ is a plan view of the rake;

Fig. 2 is a front elevation of the device, the seat broken away;

Fig. 3 is an enlarged section on the line 3—3 of Fig. 2;

Fig. 4 is a similar section on the line 4—4 of Fig. 1;

Fig. 5 is a similar section on the line 5—5 of Fig. 1;

Fig. 6 is an enlarged section on the line 6—6 of Fig. 1;

Fig. 7 is a section on the line 7—7 of Fig. 1;

Fig. 8 is a detail side elevation, partly in section, of a modified form of seat.

Referring to the drawings by characters of reference:

To simplify the description of the device, the same will be divided into four general parts consisting of the platform, designated generally by the character P; the central portion, supported above the bull wheel, which will be termed the elevator section and designated by the character E; the loader L; and the rake R.

The usual form of harvester is used as the basis for the structure and is supported for traction on the customary bull wheel 10 and grain wheel 11.

The platform P has secured to its forward edge the usual knife guards 12 through which the knife 13 is ordinarily reciprocable. While these parts could be removed, not being used with the harvester converted into a hay loader, it is preferable to clamp thereon a suitable housing, not shown, in order to protect these parts, if desired.

The platform proper is supported by the usual rectangular frame having a front bar 14 and a rear bar 15. For the purpose of the present structure an extension formed of angle irons 16 is bolted or otherwise secured to the front and rear bars 14 and 15 of the platform frame so as to extend the platform to accommodate the wide swath taken by the rake. The end roller is moved out and journaled in this extension, as indicated most clearly in Fig. 3, and the platform canvas is extended to take over this roller.

Journaled in the front bar 14 and rear bar 15 of the platform frame are the usual rollers 19 over which the platform canvas passes. The shaft of the inner roller 19 extends rearwardly beyond the frame of the machine and there is rigidly fixed to such extending end a sprocket wheel which is engaged by the sprocket chain in the usual manner. As this structure is old and well known, the same being found on every binder in use, a clear and detailed showing of the same has not been made.

Secured to the side bars 22 of the frame of the rake R are arms 21, the inner one of which is curved downwardly and pivotally secured to a rod 17 which is suitably secured below the platform while the outer arm has pivotal connection to the end bar of the platform extension. The rake is one of the usual rakes now on the market and in which a shaft 23 extends transversely of the frame, in the side bars of which it is journaled, and carries a reel on the cross arms of which are secured the rake teeth 24, adapted to deliver the hay to the slatted incline 25 up which it is drawn by the reciprocating rake bars 26.

The hay is delivered from the upper end of the incline 25 onto a directing plate 27 which is suitably hinged or otherwise connected to the frame work of the rake and the forward end of which rests on the platform P. As will be seen, one portion, 28, of the plate 27 extends forwardly farther and is raised slightly above the other portion to insure a more even distribution of the hay on the platform canvas.

The central portion E, of the structure is that found in the usual harvester from which the reel; the upper canvas and its rollers, the levers and their support, and the seat have been removed.

Uprights 29—29 are secured to the front and rear of the harvester frame, at the junction of the platform with the elevator portion E, and a brace rod 30 extends between the upper ends of these uprights to which it is secured in any suitable manner.

A crank shaft 31 is journaled in the uprights 29, the shaft being adjusted by selectively positioning its ends in slots 32 formed in the uprights 29. An arm 33 is pivotally secured to each upright 29 and is swung down against the upright to retain the ends of the crank shaft 31 in place in the slots.

Rake bars 34 are pivoted, near one end, to the crank shaft 31, while from a point near the other end of each bar rises a yoke 35 which embraces and slides upon a rod 36. The rods 36 are suitably spaced and extend from a bar 37 which is secured between uprights 38—38, suitably secured to the front and rear frame work of the central portion E and from which they rise. The rods 36′ are connected at their outer ends by a bar 39 which tends to strengthen the structure and retain the bars 36 in proper spaced relation. The crank shaft 31 extends beyond the upright 38 at its rear end and upon this end is secured a sprocket wheel 40 which is driven through a chain 41 which passes over a sprocket 42 which is rigid on a stub shaft 43. The stub shaft 43 is suitably journaled in the frame work of the machine and has also rigidly affixed thereon another sprocket 44 which is positioned between the sprocket 42 and the frame of the machine and which engages the main drive chain 45 of the harvester structure.

It will be apparent, from the foregoing, that the rake bars 34 coöperate with the regular elevator canvas 46 of the binder structure to elevate the hay and deliver it to the binding platform 47 of the structure.

It is to be noted that the binding mechanism is removed in converting the harvester into a hay loader as is also the bundle carrier. If, therefore, we should leave the structure as so far described, it would act as a side rake or windrower, the hay gravitating from the binding platform 49 and being deposited in rows.

For the purpose of converting the structure into a loader, supports 48 (see Figs. 2 and 4) are secured to the front and rear of the frame work of the section E and in position to support the loader to receive hay from the binding platform 47. To the upper end of each support 48 is bolted, or otherwise suitably secured, a U bracket 49 which embraces the support, as seen most clearly in Fig. 7, with its cross bar spaced from the support. Within this space arms 50 which depend from the loading mechanism are inserted.

Each arm 50 is apertured near its upper end and forms a journaling means for a shaft 51 the ends of which project through the arms and through the apertures formed in the front and rear frame work of the device. Affixed on the rearwardly projecting end is a sprocket wheel 52 engaged by a sprocket chain 53 which passes over an extra sprocket wheel, 54, affixed to the shaft of the upper roller of the lower elevator canvas.

The forwardly projecting end of the shaft 51 has a pinion 55 affixed thereon which meshes with a pinion 56 secured on a stub shaft 57 which is suitably journaled in the frame work of the loading mechanism. A sprocket wheel 58 is also secured on the stub shaft 57 for a purpose hereinafter to be set forth.

The platform or frame of the loading mechanism is pivotally secured, at its inner end, to the shaft 51 from which it is hung between the arms 50. This platform has upturned front and rear edges 59—59 from the outer end of each of which rises a standard 60.

A supporting bar 61 extends between the standards 60 and to the bar are secured rods 62 which are suitably spaced and extend laterally to one side of the bar. A bar 63 is preferably secured to the outer ends of these rods for the purpose of maintaining them in alinement.

A yoke 64 straddles each rod 62, upon which it slides, and serves as a hanger for one end of a rake bar 65 which is pivotally connected at a median point to a crank shaft 66.

The crank shaft 66 is journaled in supports 67—67 which rise from a median point on each upturned edge 59. The forward end of the crank shaft extends beyond its support 67 and has affixed thereon a sprocket wheel 68 which is geared through the sprocket chain 69 to the sprocket wheel 58.

Another shaft or roller 70 is journaled in the outer ends of the sides 59 of the loader platform and a canvas 71 may run over this roller and the roller or shaft 51 and co-operate with the rake bars 65 in transporting hay through the loader structure.

The side bars 72 of a frame are pivotally secured at their outer ends, to the upper ends of the uprights 60 and these side bars may be connected by the tie pieces 73—73.

The inner ends of the side bars 72 are offset and upon the lower face of each offset portion is formed a rack 74 which is adapted to mesh with a pinion 75, one of which is mounted adjacent each end of a shaft 76. A retaining piece 77 is secured to each side bar 72 and underlies the pinion 75 to retain the rack and pinion in mesh.

The shaft 76 is journaled in the upper ends of the uprights 38 and mounted on the shaft, adjacent each pinion 75, is a ratchet 78 each of which is engaged by a pawl 79 which is firmly affixed to a rock shaft 80.

The rock shaft 80 extends beside and parallel to the shaft 76, and is journaled in links 81 which are loosely mounted on the shaft 76. Each pawl is loose on the shaft 80 and its movement about the shaft in either direction is limited by the stops 82.

A cord 83 is secured to a crank 84 on the shaft 80 and this cord is led to the outer end of the loading device so that the same may be pulled by the attendant on the load when he desires to rock the shaft and release the pawls so as to adjust the loading mechanism vertically. The shaft 80 is automatically rocked to normal position by a weight 85 carried on a crank arm 86 which is secured to the shaft, or it may be retained in normal position in any other suitable manner.

The shaft 76 is also supplied with a crank arm 87 at its rear end, which may also be operated to raise or lower the loading mechanism.

Referring more particularly to Fig. 4, a stub shaft 87 is journaled in the main frame just to the rear of the bull wheel and upon the projecting ends of this shaft are mounted the sprocket wheels 88 and 89 respectively. The sprocket 88 is in line with the main drive sprocket of the bull wheel and which engages the bull wheel chain 90, which passes under the sprocket as shown. The chain 90 also passes over the regular sprocket 91 which is to be found on all harvesters and which is rigid on the main shaft 92 which drives, through the beveled gears 93, the chain 45 which drives the various canvas rolls.

Brackets 94 are hung beneath the rear portion of the main frame work and in these brackets a shaft 95 is journaled and on this shaft is fixed a sprocket 96 which is in gear through a chain 97 with the sprocket 89. Another sprocket 98 is also secured on this shaft and this sprocket is in gear through a chain 99 with the sprocket 100 of the rake.

The wheels 101 support the usual truck to which is secured the yoke 102 from which the tilting lever has been disconnected as tilting of the structure is not needful while in use as a hay loader. The yoke may then be connected in any suitable manner to the main frame. A seat 103 may be mounted on the truck and, by preference, a platform 104 is also secured on the truck for the convenience and safety of the driver.

In Fig. 8 an alternative method of providing a seat is shown. In this instance the lever support 105 is bolted or otherwise secured to the rear frame of the harvester and on this rack is secured a seat 106.

As the major portion of this device operates after the manner of the well known harvesters now in general use, it is thought that the same will be amply understood from the foregoing without a detailed explanation thereof.

Having thus described the invention, what is claimed as new and sought by Letters Patent, is:—

1. A hay loader, comprising a harvester frame and operative mechanism journaled therein, said harvester including a platform, and a binding platform, a collecting element secured to the frame and adapted to deliver material to the platform thereof, means for gearing the collecting element to the operative mechanism, and means for elevating the material from the platform to the binding platform whereby the material gravitates from the binding platform and is deposited in rows.

2. A hay loader, comprising a harvester frame and operative mechanism journaled therein, there being a platform in the frame, a collecting element secured to the frame and adapted to deliver material to the platform thereof, means for gearing the collecting element to the operative mechanism, means for elevating the material from the platform, a loader adapted to receive the elevated material, and means for operating the loader to deliver material to the load.

3. A hay loader, comprising a harvester frame and operative mechanism journaled therein, there being a platform in the frame, a collecting element secured to the frame and adapted to deliver hay to the platform thereof, means for gearing the collecting element to the operative mechanism, means for elevating the hay from the platform, a loader secured to the frame and adapted to receive the elevated hay, means for operating the loader to deliver hay to a wagon, and means for adjusting the loader vertically.

4. A hay loader, comprising a harvester frame including a platform and operative mechanism journaled in the frame, a collecting element secured to the frame and adapted to deliver hay to the platform, means for gearing the collecting element to the operative mechanism, means for elevating the hay from the platform, a loader secured to the frame and adapted to receive the elevated hay, pawls for normally holding the loader in set position, and means for releasing the pawls to adjust the loader.

5. A hay loader, comprising a harvester frame including a platform, means for delivering hay to the platform, means for elevating hay from the platform, a loader secured to the frame, arms pivotally secured to the loader, and means carried by the frame and engaging the arms for adjusting the loader.

In testimony that I claim the foregoing as my own I have hereto affixed my signature in the presence of two witnesses.

THOMAS THOMPSON.

Witnesses:
MARION A. MIERS,
ALBERT H. MEYER.

Copies of this patent may be obtained for five cents each, by addressing the "Commissioner of Patents, Washington, D. C."